United States Patent [19]
Mieth

[11] 4,362,327
[45] Dec. 7, 1982

[54] SEPARABLE PIPE AND/OR ARMATURE CONNECTION

[75] Inventor: Hans O. Mieth, Hamburg, Fed. Rep. of Germany

[73] Assignee: Otto Tuchenhagen GmbH & Co. KG, Fed. Rep. of Germany

[21] Appl. No.: 130,609

[22] Filed: Mar. 17, 1980

[30] Foreign Application Priority Data

Mar. 19, 1979 [DE] Fed. Rep. of Germany ....... 2910684

[51] Int. Cl.$^3$ ............................................. F16L 19/06
[52] U.S. Cl. ............................... 285/332.3; 285/334.5; 285/365
[58] Field of Search ............ 285/367, 366, 365, 332.3, 285/334.5, 354, 350

[56] References Cited

U.S. PATENT DOCUMENTS

| | | | |
|---|---|---|---|
| 1,137,113 | 4/1915 | Bouchard | 285/332.3 X |
| 1,563,836 | 12/1925 | Copp | 285/332.3 X |
| 2,131,552 | 9/1938 | De Lin | 285/332.3 |
| 2,453,813 | 11/1948 | Prince | 285/334.5 X |
| 2,557,495 | 6/1951 | Bily | 285/354 X |
| 2,780,483 | 2/1957 | Kessler | 285/332.3 |
| 3,029,095 | 4/1962 | King et al. | 285/367 X |
| 3,116,944 | 1/1964 | Parker | 285/354 X |
| 3,381,980 | 5/1968 | Smith | 285/334.5 X |
| 3,537,731 | 11/1970 | Reddy | 285/332.3 X |
| 3,615,109 | 10/1971 | Brinda et al. | 285/354 X |

FOREIGN PATENT DOCUMENTS

| | | | |
|---|---|---|---|
| 843936 | 7/1952 | Fed. Rep. of Germany | 285/365 |
| 1058324 | 5/1959 | Fed. Rep. of Germany | 285/365 |
| 1086073 | 8/1954 | France | 285/332.3 |
| 689932 | 4/1953 | United Kingdom | 285/354 |
| 820113 | 9/1959 | United Kingdom | 285/354 |

Primary Examiner—Thomas F. Callaghan
Attorney, Agent, or Firm—Jenkins, Coffey, Hyland, Badger & Conard

[57] ABSTRACT

A pipe or armature connection includes two interfitting connecting members. The connecting members include surfaces providing axial and radial guidance upon their assembly but require only a small space for assembly and disassembly. One of the connecting members includes a groove dimensioned to positively retain an O-ring sealing member placed therein so that it will not fall from the groove. The dimensions of the groove and the one connecting member are such that the bulging portion of the O-ring is protected from damage by the extended surface of the one connecting member. Upon assembly of the two connecting members, the O-ring is urged into the space between the two members, thereby precluding the collection of materials in the space and rendering the connection more easily cleaned. This system is particularly advantageous in pipe systems that carry food products and materials that must be hygienically cleaned after use.

2 Claims, 1 Drawing Figure

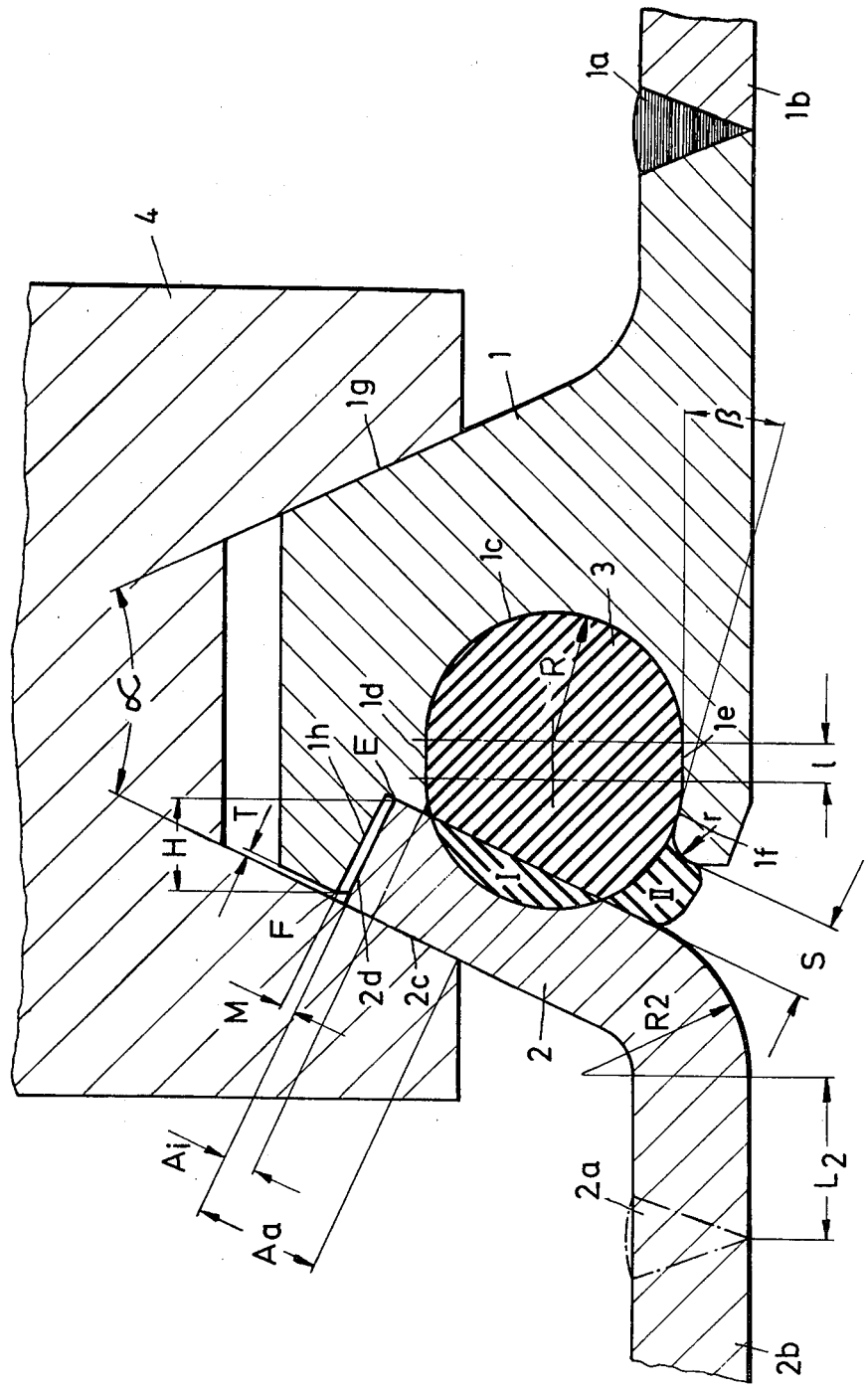

SEPARABLE PIPE AND/OR ARMATURE CONNECTION

The invention concerns among other things a separable pipe and/or armature connection with elastic packing ring, consisting of two connecting pieces which are fastened on the pipe ends and/or armature housing parts to be connected by self-substance locking, positive locking or force locking or by means of corresponding combined connecting techniques and which develop between themselves an elastic packing ring completely or partly under prestress, and a device compressing the connecting components in the direction of the axial axis of symmetry of the armature and/or pipe components which are to be connected.

Separable pipe and/or armature connections of that type facilitate the assembly and disassembly especially of complex pipe or armature systems or make their assembly and/or disassembly possible at all at an economically justifiable expense.

It is known to provide the ends of pipe and/or armature housing components which are to be connected with massive cylindrical flanges which are connected with each other by suitable connecting means. Serving as sealing means are rigid or elastic packing rings with a rectangular or circular cross section. For clear positioning of these packing rings between the flanges to be connected, grooves are provided in the flanges into which the packing rings are partly embedded.

On embodiments of the mentioned flange connections using a packing ring with rectangular cross section, the prestress and operational forces are transferred entirely via the flanges on the packing ring. This preferably changing and/or swelling stress has in view of the packing ring an effect which shortens the utility life.

Other embodiments avoid this disadvantage in that the flanges are in prestressed state on the outside of the packing ring in mutual contact. The elastic packing ring is then deformed and spreads into a gap remaining between the flanges on the inside of the packing ring. While the packing ring is with this embodiment in the operational state of the connection no longer dynamically stressed, the flange connection has other grave disadvantages. One of the disadvantages is that the packing ring is not safely fixed in position in the assembly or disassembly of the connection and that it can thereby be damaged specifically in the assembly. Another disadvantage is that the packing ring must in each assembly and disassembly of the connection be mashed, which involves the danger of damage.

Also known are standardized pipe screw connections (for instance according to DIN 11851) which, however, are as well associated with considerable disadvantages. While with these connections damage to the packing ring of a rectangular cross section is extensively eliminated in the assembly or disassembly, these pipe screw connections have a relatively large installation and/or removal height. Furthermore, the packing ring is dynamically stressed by operational forces in a fashion reducing its service life. The gravest disadvantage seems to be that the pipe screw connection is bacteriologically not satisfactorily designed. In the automatic cleaning of points with difficult access, product residues can attach which especially in the use of this connection in the food and beverage industry represent sources of reinfection.

A purpose of the present invention is to provide a separable pipe and/or armature connection of the initially characterized category which avoids the enumerated disadvantages of known solutions and which at the same time can be manufactured with greater material savings and at most favorable cost than the known solutions.

It is the purpose of the invention to provide a separable connection of pipes and/or armatures, specifically for systems which must meet hygienic requirements, where the seal used can be damaged neither mechanically nor chemically. Envisaged in conjunction with mechanical damages are especially possible damages during assembly which can occur through sharp edges of the connecting components. Mechanical damage of the seal is to be eliminated also in installed condition. Also, an extremely small gap shall inventionally exist in radial direction between the seal and the product space, and the seal is supposed to bulge in this gap toward the product space. What matters here is the ratio of length to width, with the length being smaller than the the width. Due to thermal tension, a connection may "work"; it can become leaky thereby, prompting an operator to "adjust" the connection. Such further compression of the seal can cause its mechanical destruction. In the context of chemical damages it is pointed out that, e.g., food systems require constant cleaning. The cleaning agent used shall inventionally have areas of attack on the seal which are as small as possible.

Specifically, the above objective is supposed to be accomplishable through the invention also when the previously used connecting components welded on the pipes to be connected are not used but the connection is made without these components directly on the pipes to be connected.

These purposes are accomplished in that the connecting component and the connecting countercomponent guide each other mutually in the joining of the pipe and/or armature connection via the guide surfaces, in that the connecting components bear on each other and center each other via the inner contact face when axial compression forces act on the connection, in that the connecting component is provided with a groove in which the packing ring is prior to joining the pipe and/or armature connection embedded in form-locking and/or force-locking fashion, and in that after the joining of the pipe and/or armature connection the packing ring will in the final position of the connecting components as defined by the inner contact face bulge out, as a result of the deformation caused by the connecting component, into the gap between the connecting component and connecting countercomponent and at least fill out the part of the gap which diverges toward the groove.

The rigid connection of connecting component and connecting countercomponent via the inner contact surface avoids a dynamic stress of the packing ring during the operation of the connection. The force locking proceeds within the connection under exclusion of the elastic packing ring. Besides, the inner contact surface assumes in the final operating position of the connecting components their mutual centering. The guide surfaces provided in the connecting components assume in the joining of the connection their noncanting mutual guidance.

The positive-locking and/or force-locking embedding of the packing ring in the groove within the connecting component ensures a clear positional fixing of the packing ring within the connecting component. A dropout of the packing ring and damage to it, especially during assembly of the connection, are eliminated. On its way to the final operational position of the connecting component the elastic packing ring is increasingly deformed. Since the packing ring material is incompressible, it bulges out into the gap between connecting component and connecting countercomponent, due to the deformation caused by the connecting countercomponent, with the groove cross section remaining in the operational state being so dimensioned that at least the gap part diverging toward the groove is filled by the deformed packing ring. This bulging of the packing ring into the gap part diverging toward the groove provides bacteriologically flawless conditions in this area. Product residues have no access to the undercuts of the gap area which are critical in terms of cleaning. Since the packing ring is deformed only once each in the assembly and disassembly of the connection, it has in comparison to dynamically stressed packing rings of known connections a longer surface life. Fatigue and disintegrating phenomena do not occur at all or only after a considerably longer operating time.

The groove bottom has in a favorable embodiment a fillet radius which is smaller than the radius of the undeformed packing ring with a circular cross section. In addition, the groove bottom extends by design, for one, on the outside of the groove tangentially into a cylindrical outer flank face and, for another, on the inside of the groove tangentially into a cylindrical inner flank face which possesses the length of the stretched length of the packing ring while following the inner flank face a beveled face reduces with its angle of inclination the width of the groove. Owing to this particular shape of the groove, the elastic packing ring, for one, is stretched so as to bring about a force locking contact of the packing ring within the connecting component, while, for another, it is as well positively embedded in the groove which safely prevents its dropping out of the groove.

In order to protect the packing ring during assembly and disassembly of the connecting components from mashing stresses, the undeformed limiting face bulging out of groove, of the packing ring embedded in the groove, is located within the installation and/or removal height of the connection.

In another embodiment of the pipe and/or armature connection the connecting component and the connecting countercomponent possess a tapered mounting face in interaction with a connecting component which is divided in the cross-sectional plane of the connection and compresses the connecting components according to the principle of a key connection in the direction of the axial axis of symmetry of the armature housing and/or pipe components which are to be connected. With this so-called clamping ring connection, known as such, the material-saving design of the innovation comes to bear fully.

In certain applications a cost saving is realized in that according to another embodiment of the innovation the connecting counterpiece on an armature housing and-/or pipe part is produced selectively long by a non-cutting shaping. The cost saving is constituted, for one, by the design of the connecting counterpiece as a plate type part and, for another, by the elimination of a self-substance locking, force-locking or positive locking of the connecting point.

On another embodiment of the innovation, cylindrical flanges known as such are provided both on the connecting piece and the connecting counterpiece, which flanges are positively connected with each other by means of connecting agents known as such. This design combines the advantages of the object of the application with those of the customary flange connection.

Another embodiment of the innovation is distinguished by the provision of customary standardized threaded pipe connecting parts both on the connecting component and the connecting countercomponent, which threaded parts can be positively connected with each other by an as well standardized cupling nut. The initially described disadvantages of standardized threaded pipe connections are avoided through this design.

An embodiment of the invention is illustrated in the drawing and will be more fully described hereafter.

The FIGURE illustrates a center section through the separable pipe and/or armature connection with an elastic packing ring where the connecting component is fashioned as a clamping ring.

The connecting component 1 and the connecting countercomponent 2 are illustrated in the FIGURE in their final operating position. They touch and center each other by way of the inner contact face $A_i$. The tapered clamping face 1g on the connecting component 1 and the tapered clamping face 2c on the connecting countercomponent 2 form together the flank angle $\alpha$. A connecting component 4 featuring a conic recess with a flank angle $\alpha$ compresses the connecting components 1,2 according to the principle of a wedge connection in the direction of the axial axis of symmetry of the armature housing and/or pipe components which are to be connected. The connecting countercomponent is clamped under static definition between the inner contact face $A_i$ and the outer contact face $A_a$. This statically defined installation position is ensured via the gap T between connecting component 1 and connecting component 4. The assembly gap M which is arranged radially between the connecting components 1 and 2 ensures that these will in their final operating position not cause a mutual disalignment. When establishing the connection, the guide faces 1h, 2d on the connecting component 1 and connecting countercomponent 2 assure their mutual guidance free of canting. Worked into the connecting component 1 is a groove 1c or cavity whose bottom has the fillet R. The groove bottom extends for one, on the outside of the groove 1c, tangentially into a cylindrical outer flank face 1d and for another, on the inside of groove 1c, also tangentially into a cylindrical inner flank face 1e. The axial extension of the inner flank face 1e corresponds with the stretched length l of the packing ring 3 which in positive or forcelocking fashion is embedded between connecting component 1 and connecting countercomponent 2. Following the inner flank face 1e is a conic face 1f which with its inclination angle $\beta$ reduces the width of the groove 1c. The conic face 1f extending into the rounding r forms together with the opposite connecting counterpiece 2 the gap S. In the final position of the connecting components 1, 2 as defined by the inner contact face $A_i$ the packing ring 3 bulges out into the gap S between connecting component 1 and connecting countercomponent 2, due to the deformation caused by the connecting countercomponent 2. The fictitious deformation section I covered by the connecting countercomponent 2 appears in the FIGURE areally as a bead II within the gap S. The groove 1c is cross-sectionally so dimensioned that at least the part of gap S diverging toward the groove 1c will be filled by the bead II of the packing ring 3. The fillet R of the bottom of the groove 1c is smaller than the radius of the undeformed packing ring 3 with a circular cross section. The difference between the radii is so dimensioned that the stretched length l of the packing ring 3 will be obtained, yet with the undeformed limiting surface bulging out of the groove 1c still located to the right of the plane limited by the surrounding edge F.

The connecting component 1 is connected with the primary pipe or primary armature housing 1b by a welding bead 1a. One the other side of the connection, the connecting component 2 connects by way of the welding bead 2a, after a selective length $L_2$ of the connecting countercomponent 2, with the subsidiary pipe of the subsidiary armature housing. The connecting countercomponent 2 may be fashioned, e.g., by noncutting shaping under formation of the forming radius $R_2$ on the selective length $L_2$ of the armature housing and-/or pipe part.

As follows also from the FIGURE, the axial spacing between the surrounding edges E, F—the so-called installation and/or removal height H—must be surmounted both in the assembly and the disassembly of the connection. Since the undeformed limiting face bulging out of the groove 1c, of the packing ring 3 embedded in the groove 1c, is located within the installation and/or removal height H, any mashing or shearing stress of the packing ring 3 during assembly or disassembly of the connection is eliminated.

The welding beads 1a, 2a illustrated in the FIGURE substitute for other known connecting techniques between parts of same or different materials.

I claim:

1. In a separable connection of pipes or armatures for systems which must meet hygienic requirements, including two connecting sections attached to the pipe ends or armature ends between which an O-ring can be arranged, and a third component to fasten the two connecting components together, the improvement comprising one connecting component having a frustoconical outer clamping face and a frustoconical inner contact face and a second surface extending outwardly from its frustoconical contact face to form a recess in which the other connecting component can be inserted, the other connecting component being the flared end of a pipe or armature with a frustoconical outer clamping face and a frustoconical inner contact face, the second surface of the one connecting component providing guidance of the other connecting component, the frustoconical contact face of the recess positioning the other connecting component in the assembly without contact between the connecting components at the second surface of the one connecting component, the one connecting component having an O-ring groove in its frustoconical contact face with a bottom having a radius which is smaller than the radius of the undeformed O-ring, with an outer face extending tangentially from the outermost point of the groove bottom to the frustoconical contact face, and with an inner face extending tangentially from the innermost point of the bottom groove for a length equivalent to the stretched length of the O-ring in place in the groove and thereafter into a beveled face with its inclination angle reducing the width of the groove to less than twice the radius of the undeformed O-ring, said O-ring groove being sheltered by the second surface, the inner face of the O-ring groove extending into a surface forming, upon assembly, a gap with an opposing surface of the other connecting component, the third component being split in the cross-sectional plane of the connection and having a pair of frustoconical surfaces to engage the frustoconical outer clamping faces of the two connecting sections and compress them together in the direction of their central axis of symmetry.

2. In a separable connection according to claim 1, the improvement in which, the end of the inner face of the O-ring groove is rounded, the gap is extremely short in radial direction between the groove containing the O-ring and the interior of the pipe, and the O-ring bulges out of the groove into the interior space of the pipe.

* * * * *